United States Patent [19]

Brenner et al.

[11] Patent Number: 5,894,988

[45] Date of Patent: Apr. 20, 1999

[54] BURNER FOR A VEHICLE HEATER OR A PARTICLE FILTER REGENERATOR

[75] Inventors: Dirk Brenner, Stuttgart; Erwin Burner, Adelberg; Jürgen Epple, Waldenbuch; Stefan Ottenbacher, Pliezhausen; Jürgen Peschke, Altbach; Wolfgang Pfister, Esslingen; Monika Sigle, Wernau; Peter Steiner, Aichwald, all of Germany

[73] Assignee: J. Eberspächer GmbH & Co., Esslingen, Germany

[21] Appl. No.: 08/817,990

[22] PCT Filed: Oct. 5, 1995

[86] PCT No.: PCT/DE95/01392

§ 371 Date: Apr. 16, 1997

§ 102(e) Date: Apr. 16, 1997

[87] PCT Pub. No.: WO96/12916

PCT Pub. Date: May 2, 1996

[30] Foreign Application Priority Data

Oct. 20, 1994 [DE] Germany .............. 44 37 567
Nov. 18, 1994 [DE] Germany .............. 44 41 185
Mar. 3, 1995 [DE] Germany .............. 195 07 556

[51] Int. Cl.$^6$ .................................. F23N 5/20
[52] U.S. Cl. ................. 431/6; 431/12; 237/2 A
[58] Field of Search .............. 237/2 A, 12.3 C; 431/12, 80, 6

[56] References Cited

U.S. PATENT DOCUMENTS

| 4,891,004 | 1/1990 | Ballard et al. | 431/6 |
| 4,978,291 | 12/1990 | Nakai | 431/12 |
| 5,078,317 | 1/1992 | Kenner et al. | 237/2 A |

*Primary Examiner*—Henry Bennett
*Assistant Examiner*—Derek Boles
*Attorney, Agent, or Firm*—McGlew and Tuttle

[57] ABSTRACT

A burner for a vehicle heater of a particle filter regenerator including a combustion air blower, a combustion chamber with a fuel evaporator, a fuel supply with a fuel metering pump by which the fuel is proportionately fed to the evaporator, a glow-plug to ignite a mixture of combustion air and vaporized fuel and a control device, in which the control device switches the flow-plug on to ignite the mixture, starts the fuel metering pump after a first period following the switch-on of the glow-plug and substantially simultaneously with the starting of the fuel metering pump or a second period thereafter initiates a gradual increase in the speed of the combustion gas blower from a standstill or low speed rotation.

19 Claims, 4 Drawing Sheets

1

BURNER FOR A VEHICLE HEATER OR A PARTICLE FILTER REGENERATOR

FIELD OF THE INVENTION

The present invention pertains to a burner for a vehicle heater or a particle filter regenerator with an air blower, fuel evaporator and glow plug.

BACKGROUND OF THE INVENTION

Vehicle heaters, which are also called "parking heaters" or "auxiliary heaters" in a passenger car, are also used in trucks, buses, campers, boats, but also construction equipment, besides passenger cars.

These vehicle heaters are operated with gasoline or diesel fuel, with a burner heating a heat carrier (air or water).

There are various types of vehicle heaters, which are distinguished, besides according to the type of the heat carrier, according to the type of the fuel (gasoline/diesel fuel) and according to the type of the burner as well as other design features. Besides burners with mechanical atomizers and rotary distributors, there are especially burners with evaporators. These vaporizing burners are of special interest for the present invention.

Vaporizing burners are used not only in vehicle heaters, but also in regenerators for particle filters, which are increasingly used in diesel engines. The cleaning or regeneration of the particle filter is performed by burning out.

The burner being disclosed here may be used equally for vehicle heaters and such particle filter regenerators.

Vaporizing burners contain, besides the combustion air blower, which is also usually used in other types of burners, and the fuel feed pump, which is also usually used, a fuel-evaporating means, typically in the form of a porous lining in the interior of the combustion chamber. Fuel is pumped by the fuel feed pump into this porous lining, so that the liquid fuel is evaporated by the porous material of the evaporator, which material has a large surface. By feeding in combustion air by means of the combustion air blower, a fuel-air mixture is formed, which is then ignited by means of a glow plug. The glow plug, which is typically designed of late as a sheathed element glow plug and is connected to a power source, is switched on to initiate the combustion. The glow plug is switched off after the ignition.

It has been known that the fuel-air mixture must be "ignitable" to form a flame of a fuel-air mixture. Besides the minimal ignition temperature, which is provided by the glow plug and is, of course, always needed, a certain ratio of air to fuel must be present in order for the ignition to be able to take place.

It was now found that the starting of the burner, especially the ignition of the fuel-air mixture, does not always take place with the desired reliability in the vaporizing burner in question.

It is common practice to start the fuel feed pump and the combustion air blower and to switch on the glow plug to start the burner. The blower and the feed pump are operated such that a maximum air and fuel throughput is reached. The environment of the glow plug is increasingly heated during the start-up phase, and when the ignition temperature is reached, the flame is formed, provided that the fuel-air mixture is indeed ignitable. However, it is not always possible to readily satisfy this condition within a relatively short period of time after the burner has been switched on.

SUMMARY AND OBJECTS OF THE INVENTION

The basic object of the present invention is to provide a burner of the type mentioned in the introduction, in which reliable ignition of the fuel-air mixture takes place within a predictable period of time.

This object is accomplished specifically in a burner for a vehicle heater or a particle regenerator, which has the following features:

a) a combustion air blower means;

b) a combustion chamber with a fuel-evaporating means;

c) a fuel feed means, which is equipped with a fuel feed pump and with which fuel is metered for the evaporating means;

d) a glow plug for igniting a mixture of combustion air and evaporated fuel; and e) a control device.

The control device performs the following functions according to a first embodiment;

switching on the glow plug for igniting the mixture;

starting the fuel feed pump during a first period of time after the switching on of the glow plug;

and initiating a gradual increase in the speed of the combustion air blower, which starts with the combustion air blower not running or with the combustion air blower running at a low speed, essentially simultaneously with the starting of the fuel feed pump or during a second period of time thereafter.

As a consequence of the gradual increase in the speed of the combustion air blower, the ratio of combustion air to fuel changes continually during this phase, so that it is ensured that a readily ignitable fuel-air mixture will be available at some time, and this mixture will then be ignited by the glow plug, which was switched on for at least the first period of time and therefore provides a sufficient amount of thermal energy. The continuing increase in the speed of the combustion air blower after the time of ignition promotes the correct propagation of the flame in the combustion chamber without risk of being blown out. If the phase of the increase in the speed of the combustion air blower begins with a blower running at a low speed, the ignited flame is normally formed already before the blower speed is increased, especially if the phase of speed increase begins only during a second period of time after the start of the fuel feed pump. The increase in the blower speed will then be used to ensure the correct and stable propagation of the flame in the combustion chamber. Thus, working with a second period of time until the beginning of the increase in the blower speed is even preferred. The so-called phase of pre-impregnation of the evaporating means or of the combustion chamber lining falls within the second period of time. Ignition takes place as soon as the fuel has reached the lining in the vicinity of the glow plug, and especially as soon as it has evaporated there.

The term "gradual increase in speed" is to express the fact that the blower speed is not increased by a large jump in speed within a short time, but the speed is increased over a period of time. Specifically, the speed may be preferably increased in a ramp-like pattern (practically linearly), stepwise or step by step, but also according to a nonlinear speed-versus-time curve.

According to a second aspect or embodiment of the present invention, the control device performs the following operations for igniting the mixture:

it switches on the glow plug;

it starts the fuel feed pump during a first period of time after the glow plug has been switched on;

and it initiates an intermittent mode of operation of the combustion air blower essentially simultaneously with the start-up of the fuel feed pump or during a second period of time thereafter.

As a consequence of the intermittent mode of operation of the combustion air blower, pulsating flow conditions develop in the combustion chamber and the fuel combustion air ratios will vary, which is favorable for reliable ignition.

The simplest, preferred case of an intermittent mode of operation is the alternating switching on and off of the blower motor at short intervals of time. However, the speed of the blower does not compulsorily have to drop to zero between the "speed peaks" of the blower. The "speed peaks" also do not have to be compulsorily essentially equally high.

The intermittent mode of operation may start with the combustion air blower not running or with the combustion air blower running at a low speed. Also there may be a phase of gradual increase in the speed of the combustion air blower after the intermittent mode of operation.

Operating with an intermittent mode of operation is especially preferred if the conditions are especially unfavorable for ignition, i.e., in the case of a combustion chamber with heavily impregnated evaporating means or combustion chamber lining after one or even several unsuccessful attempts at starting. Thus, it is especially optimal and preferred according to the present invention to carry out the first attempt at starting the burner with the procedure according to the first embodiment and to carry out the subsequent, second attempt at starting the burner with the procedure according to the second embodiment, or even with a combination of the first and second embodiments. It is clear that the transition from a first starting procedure to a second, different starting procedure is preferably performed automatically by the control device.

The term "low speed of the combustion air blower" used above (before the gradual increase in speed or before the intermittent mode of operation) preferably is the minimum speed at which the blower in question can be operated. Common minimum speeds are in the range of 300 to 1,000 rpm.

After or at its start, the fuel feed pump is preferably operated at reduced delivery capacity, and the delivery capacity is increased later, when the speed of the combustion air blower has increased considerably.

After the fuel pump has been started, the fuel feed pump is preferably operated at a delivery capacity gradually increasing within an interval of time, and the increase in the delivery capacity begins with the fuel feed pump not running or with the fuel feed pump already brought to an initial delivery capacity, At least part of the interval of time with gradually increasing delivery capacity preferably falls within the period of time during which the speed of the combustion air blower is being gradually increased or during which the combustion air blower is being operated in the intermittent mode of operation. Based on the increase in the delivery capacity, the amount of fuel being evaporated in the combustion chamber per unit of time increases, which leads to an especially reliable ignition of the burner in conjunction with the increase in speed and the intermittent mode of operation of the combustion air blower.

The term "gradually increasing delivery capacity" is to express the fact that the delivery capacity of the fuel feed pump is not increased abruptly within a short time, but the increase in the delivery capacity takes place over a period of time. Specifically, the delivery capacity may be increased practically linearly or according to a nonlinear delivery capacity-versus-time curve. If the increase in the delivery capacity begins with the fuel feed pump brought to an initial delivery capacity, the increase in the delivery capacity may begin immediately after the abrupt increase to the initial delivery capacity, or the fuel feed pump may already have been operated at the initial delivery capacity for some time before.

The combustion air blower preferably runs at the beginning for a third period of time before it is brought to the low speed or to the stop mentioned in the first embodiment, and the glow plug is switched on at least during part of the third period of time or is switched on only thereafter. This "initial phase of operation" of the combustion air blower will detach frost or ice particles that may adhere to the blower wheel in the winter, as a result of which it is ensured that the blower will start as planned during the subsequent phases. In addition, fuel fumes, which originate from a previous operation of the burner and may be present in the combustion chamber, are expelled.

It is also possible to provide a plurality of phases of speed increase one after another, which differ by the steepness of the speed increase and/or are separated by a speed plateau. This will be clearly illustrated by the exemplary embodiments described below.

The control device preferably switches the glow plug off as soon as a flame failure controller observes a stable flame in the combustion chamber or as soon as a certain glow plug time has passed after the glow plug has been switched on. The speed level of the combustion air blower reached at that time is linked with the time elapsed, and it has been known from experience that ignition will no longer take place at high blower speeds.

The burner according to the present invention is characterized in that an especially reliable ignition process is obtained from the first flame to the development of the stationary flame conditions at a low power consumption. This also applies, in particular, to fuels which are, in principle, difficult to ignite, such as diesel fuel.

If the burner fails to ignite at the first attempt at start, the glow plug is preferably operated at a somewhat higher voltage (increasing the voltage preferably by 0.2 to 0.5 V) at the subsequent second attempt at starting (as well as at further attempts at starting if necessary). After a first attempt at starting with a starting procedure according to the first embodiment, the second attempt at starting may also be performed with a starting procedure according to the first embodiment. After a first attempt at starting with a starting procedure according to the second embodiment, the second attempt at starting may also be performed with the starting procedure according to the second embodiment. A glow plug operated at an increased voltage ignites more reliably, and if this increase in voltage is used at the second attempt at starting only, the service life of the glow plug will not be shortened, either.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENTS

In FIGS. 3 through 7, the glow plug voltage is indicated by broken line, the speed of the combustion air blower by solid line, and the delivery capacity of the fuel feed pump (amount of fuel delivered or weight of fuel per unit of time) by dash-dotted line.

Figure 1:
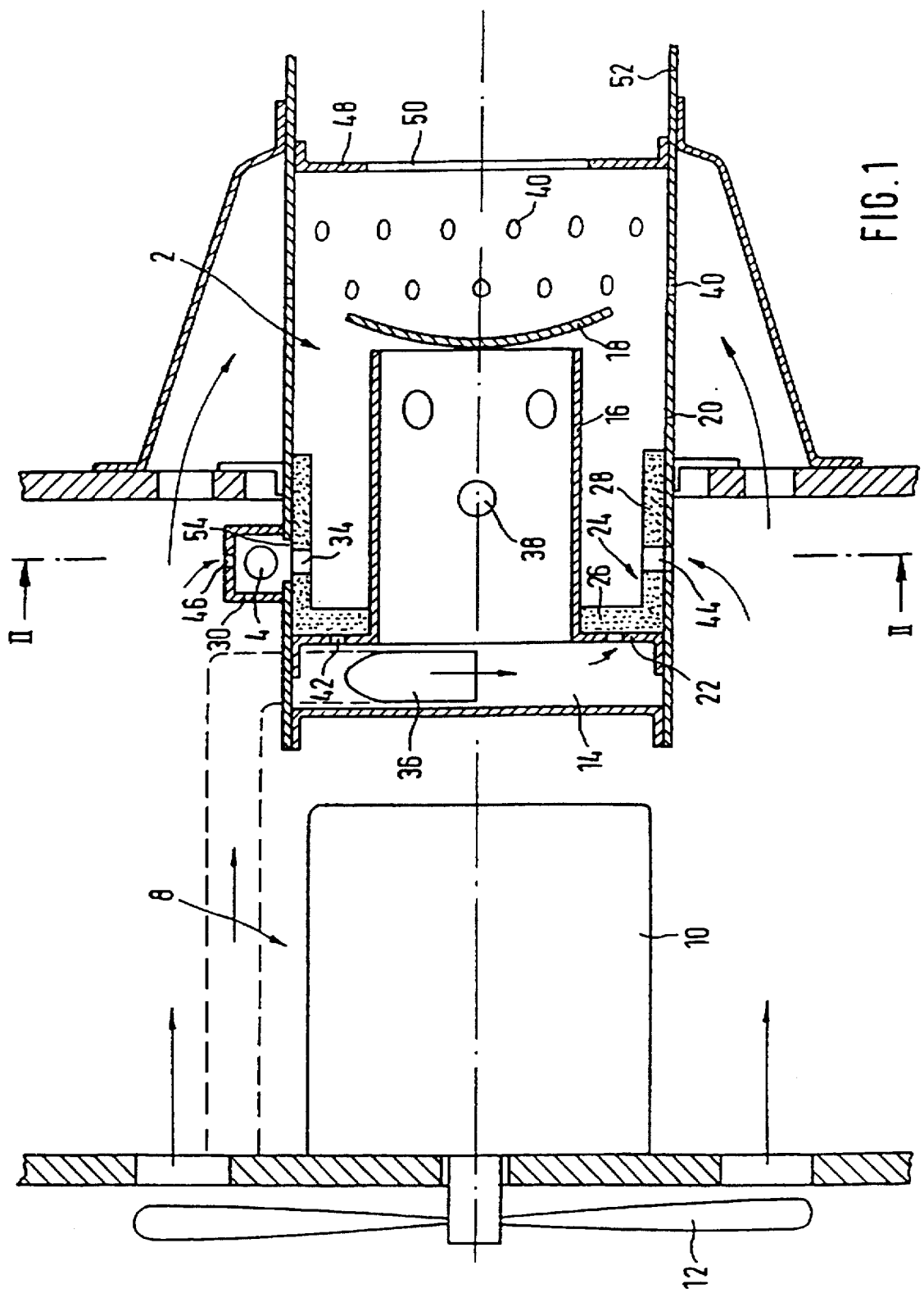
FIG. 1 shows a horizontal longitudinal section along line I—I in FIG. 2 of the burner area of a vehicle heater.
Figure 2:
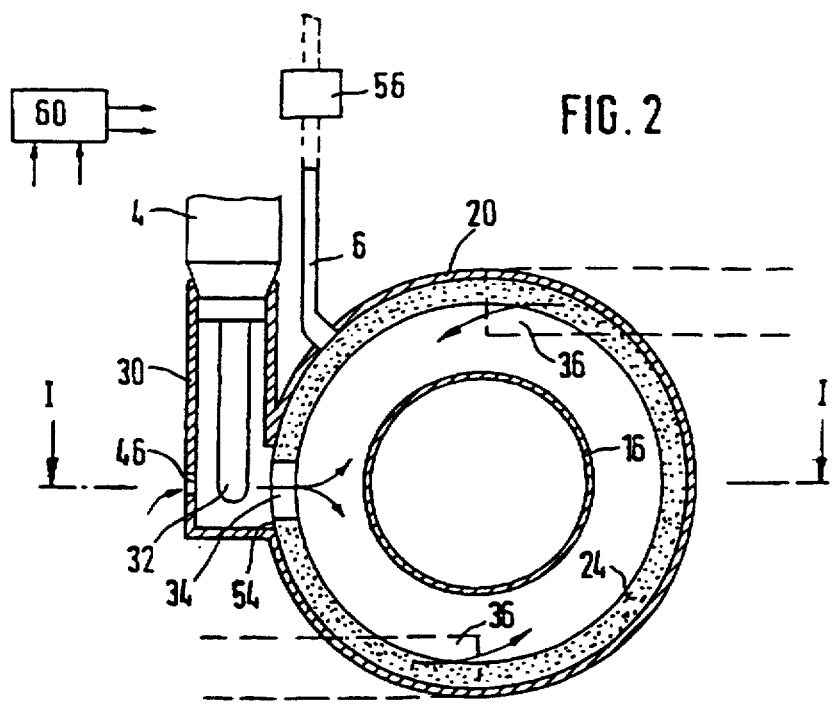
FIG. 2 shows a cross section along line II—II in FIG. 1 of the area of the burner in which the glow plug is located.

FIGS. 1 and 2 show the area of the burner of a vehicle heater which contains a combustion chamber 2 with a glow plug means 4 and with a fuel feed means 6, which will be described later, as well as a combustion air blower 8. The housing of the vehicle heater is not shown for the sake of greater clarity. In addition, the vehicle heater contains—adjoining the combustion chamber 2 on the right in FIG. 1—a heat exchanger to transfer heat from the hot combustion gases to a heat carrier.

The combustion air blower means 8 comprises an electric motor 10 and a blower wheel 12.

The combustion chamber 2 is essentially cylindrical. In the left-hand part of FIG. 1, an air feed prechamber 14 is arranged in front of the combustion chamber 2; the air feed prechamber has a cylindrical shape, whose axial length is considerably shorter than its diameter. Beginning from the prechamber 14, a tubular combustion chamber insert 16 extends into the combustion chamber 2. The combustion chamber insert 16 is open toward the prechamber 14 in the left-hand part of FIG. 1, and it is also open toward the combustion chamber 2 in the right-hand part of FIG. 1, but a disk-shaped flow guide plate 18, which is curved out of its plane and deflects the flow discharged from the insert 16 radially to the outside, is located in front of it there.

A ring-shaped partition 22 extending at right angles to the longitudinal axis of the burner is located between the insert 16 and a circumferential wall 20 of the combustion chamber 2. A porous, pot-shaped lining 24 with a bottom 26 and with a jacket 28 is arranged on the combustion chamber side, joining the burner wall 22. The bottom 26 has a central opening, which accommodates the insert 16. The side of the bottom 26, which is the left-hand side in FIG. 1, is in contact with the partition 22. The outer circumferential surface of the jacket 28 is in contact with the inner circumferential surface of the combustion chamber 2. The lining 24 is shorter in the axial direction than the insert 16.

The porous lining 24 consists of a metal wire netting and is designed as a built-in part manufactured in an integrated manner.

A tangential glow plug socket 30, which extends vertically, is attached laterally to the outer circumference of the circumferential wall 20 of the combustion chamber 2. The glow plug 4, designed as a sheathed element glow plug, is screwed into the socket 30 and has a glowing area 32. The longitudinal axis of the glow plug extends in the tangential direction in relation to the circumferential wall 20 of the combustion chamber, as can be clearly recognized from FIG. 2. At the point at which the socket 30 passes over into the circumferential wall 20, the latter is perforated. The lining 24 also has an opening at that point, but the latter opening is somewhat smaller than the perforation of the circumferential wall 20. An opening 34 is thus formed as a transition between the interior space of the socket 30 and the interior space of the combustion chamber 2.

A first portion of the combustion air delivered by the combustion air blower 8 enters the prechamber 14 via two tubes 36, only one of which is shown in FIG. 1. The two tubes 36 extend tangentially to the circumferential wall of the prechamber 14 and open into the prechamber 14 at diametrically opposite points. The combustion air flows from the prechamber 14 into the insert 16 and flows from there partly into the space between the insert 16 and the circumferential wall 20 of the combustion chamber 2 through radial openings 38 and partly out of the right-hand end of the insert 16.

Another portion of the combustion air being delivered flows to the combustion chamber 2 through radial openings 40, which are provided downstream of the insert 16 in the circumferential wall 20 of the combustion chamber 2. In addition, there are more openings for the combustion air to flow through. These are, on the one hand, openings 42 in the partition 22. Relatively small amounts of combustion air can flow through these openings 42 into the bottom 26 of the lining 24 and pass over from there, finely distributed, into the combustion chamber 2. The lining 24 has no more openings at these points, aside from its porosity. On the other hand, there are openings 44 in the circumferential wall 20 of the combustion chamber 2 at points at which the lining 24 with its jacket 28 extends into same, and these openings 44 pass through the lining 24. Finally, there also is an inflow opening 46 in the socket 30.

A flame screen 48, which has a large, central opening 50, is located at one end of the combustion chamber 2, which is the right-hand end in FIG. 1. To the right in FIG. 1, the flame screen 48 is joined by a flame tube 52, in which the combustion of the fuel takes place completely.

It is recognized from FIG. 2 that fuel is fed to the lining 24 by a fuel feed pump 56 via the fuel line 6. The fuel line 6 passes through the circumferential wall 20 of the combustion chamber 2, and its point of opening is located in the same cross-sectional plane as the glowing area 32 of the glow plug 4 and is located at an angular distance of 45° from the central axis of the above-described opening 34.

When the glow plug 4 is switched on to ignite the burner, fuel evaporates from the lining 24 both into the interior of the combustion chamber 2 and into the interior of the socket 30, the evaporation being enhanced by the heating originating from the glowing area 32 of the glow plug 4, and a surface area 54 of the lining 24 facing the interior of the socket 30 additionally contributes to the evaporation. If an ignitable fuel-air mixture is present, it is ignited in the glowing area 32 of the glow plug 4. The ignition propagates through the opening 34 into the interior of the combustion chamber 2.

To achieve reliable ignition within a relatively limited period of time, the components involved in the ignition and the operation of the burner are controlled by the control device or means indicated in the top left part of FIG. 2 in a predetermined manner, as will be explained below on the basis of FIG. 3.

The control device 60 receives status signals, e.g., concerning the temperature of the heat carrier, the existence of a flame within the burner, etc., from various sensors, which are of no immediate interest here. The control device 60 sends control signals to the fuel feed pump 56, the combustion air blower 8 and a switch for the glow plug 4, which is not shown in the drawing.

Figure 3:
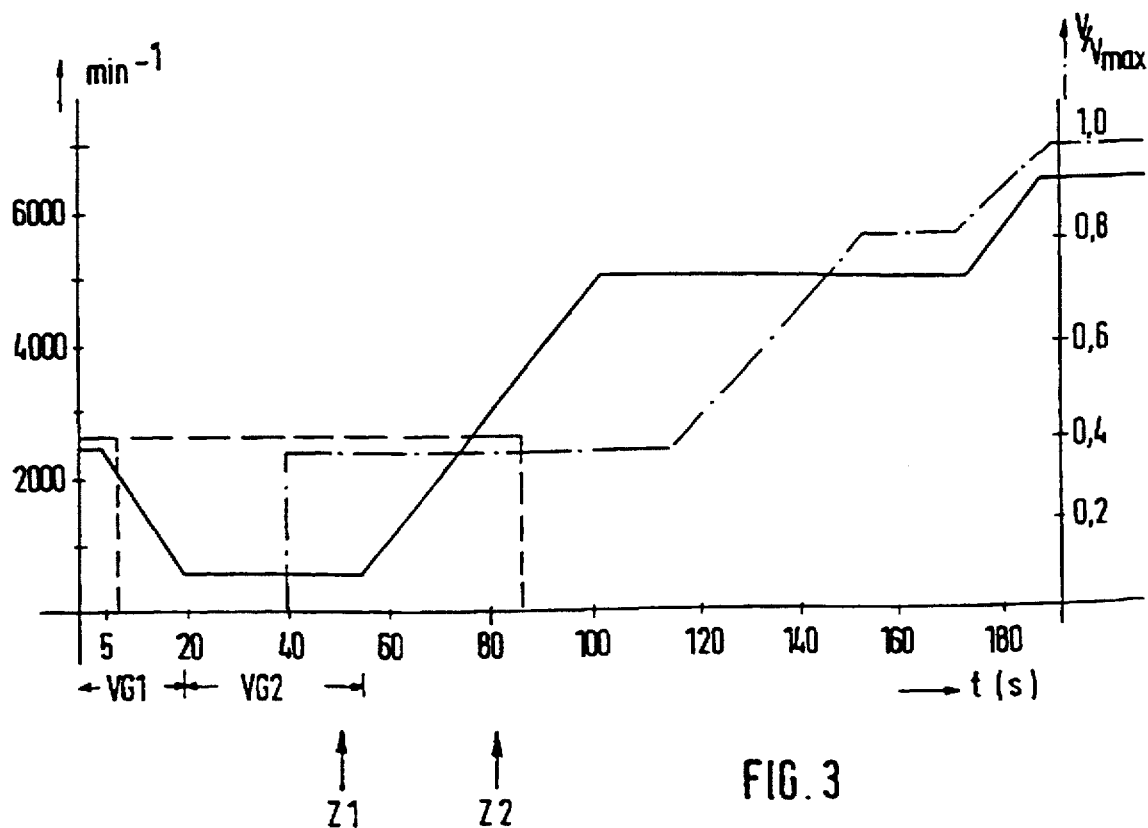
FIG. 3 shows a graphic representation of the changes in the speed of the combustion air blower, in the delivery capacity of the fuel feed pump, and the on time of the glow plug for the burners shown in FIGS. 1 and 2 over time.

According to a first exemplary embodiment, the switching on and off of the glow plug 4, the switching on and off of the combustion air blower, as well as the control of the speed of the combustion air blower 8 and of the amount being delivered by same, and of the fuel feed pump 56 correspond to a time curve as shown in FIG. 3.

The time t in sec is shown on the abscissa in FIG. 3. The speed of the motor 10 of the combustion air blower 8 is plotted to the left on the ordinate. The delivery capacity V of the fuel feed pump 56, standardized to the maximum delivery capacity $V_{max}$, is plotted to the right on the auxiliary ordinate. The delivery capacity of the fuel pump is indicated by a dash-dotted line, and the speed of the motor of the combustion air blower is indicated by a solid line. The on time of the glow plug 4 is indicated by a broken line.

The motor of the combustion air blower 8 is operated at first for a short time of, e.g., 5 sec, at a medium speed of, e.g., 2,300 rpm. This cold blow phase is used to break loose ice particles, which may adhere to the blower wheel 12 of the combustion air blower 8 in a cold environment.

The speed of the combustion air blower is subsequently lowered to a minimum speed of 500 rpm. The initial operating phase VG1 of the blower is thus concluded. About 20 sec will have passed until this point in time.

During the preglowing phase VG2, which follows now and lasts 35 sec, the combustion air blower is running at a constant, minimum speed.

The glow plug 4 is switched on already during the preglowing phase VG2, which is indicated by the broken line. The glow plug may be switched on when the combustion air blower is also switched on for the initial phase, but it may also be switched on somewhat later, as is indicated by the broken line parallel to the left-hand ordinate.

The fuel feed pump is then switched on by the control device 60 approximately in the middle of the preglowing phase VG2. Beginning from this point in time, the fuel feed pump is operated at first at reduced speed, here about 0.4 times the maximum delivery capacity $V_{max}$.

After the preglowing phase VG2, at a point in time that is about 55 sec after the switching on of the combustion air blower at time 0, the speed of the combustion air blower is increased linearly until the speed equals 5,000 rpm. The ignition takes place either at a time Z1, i.e., before the beginning of the increase in the speed of the blower, or at a time Z2, i.e., during the phase of the increase in the speed of the blower. The delivery capacity of the fuel feed pump is also raised a certain time thereafter. The delivery capacity of the fuel feed pump 56 is raised in a ramp-like pattern according to the representation in FIG. 3, and the speed of the combustion air blower is raised in a similar manner as well. The speed of the blower and the delivery capacity of the fuel feed pump are raised again after about 180 sec. After that, the combustion air blower and the fuel feed pump each operate at their respective full nominal capacities. As an alternative, it is possible to operate without the plateaus shown above in the overall speed increase of the blower and of the overall increase in the delivery capacity of the fuel feed pump.

In the exemplary embodiment according to FIG. 4, there again is an initial phase VG1 of the blower, but this time at full nominal speed of the blower, and without the glow plug being switched on during this phase. The glow plug is switched on at time T2, simultaneously with the end of the initial operating phase of the blower. The fuel feed pump is started at half delivery capacity at the time T3, which is 40 sec after T2 here. Consequently, the first period of time mentioned above extends from T2 to T3. The combustion air blower is not running during the first period of time in this exemplary embodiment.

Likewise at time T3, a gradual increase in the speed of the combustion air blower is initiated by the control device, doing so in a first ramp range with a slight increase and a subsequent, second ramp range with a greater increase up to the nominal speed. The fuel feed pump is switched over from half the delivery capacity to the full nominal delivery capacity approximately simultaneously with the transition from the first ramp range to the second ramp range or, as is shown, somewhat later.

The ignition takes place during the first ramp range, and the formation of stable flame conditions in the entire combustion chamber takes place during the second ramp range. The development of stable flame conditions is accelerated by the steeper second ramp range.

Figure 4:
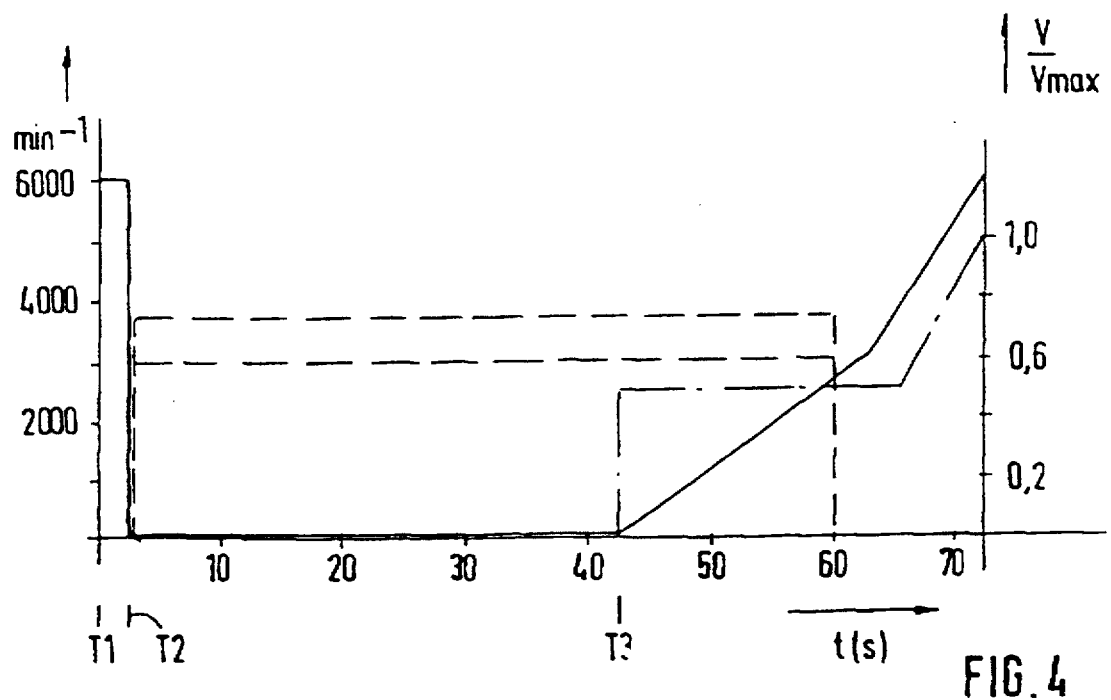
FIGS. 4 through 7 show graphic representations of the time curves as shown in FIG. 3, but with other types of curve.
Figure 5:
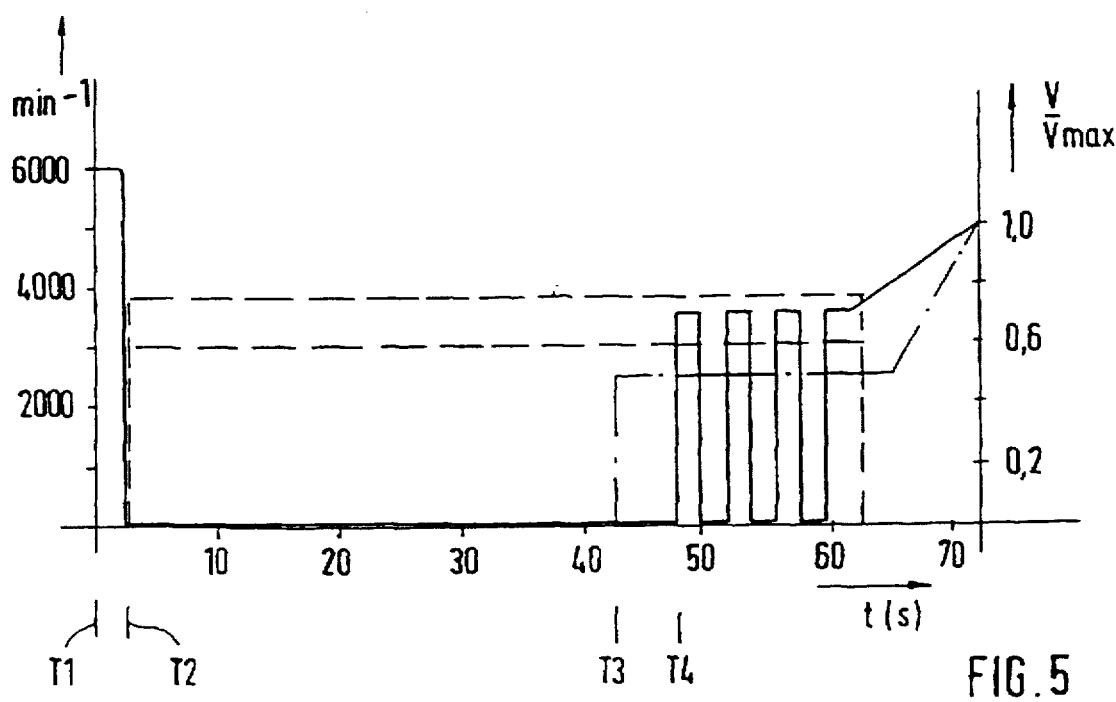

An intermittent mode of operation of the combustion air blower, comprising switching on three times for 2 sec each and then a switched-off time of likewise 2 sec, is initiated at the time T3 in the exemplary embodiment according to FIG. 5. The phase of the gradual increase in the combustion air blower takes place only thereafter. The ignition takes place during the phase of the intermittent mode of operation. Before the intermittent mode of operation, the changes in the blower speed over time are the same as in the exemplary embodiment according to FIG. 4, and so are the changes over time in the switching on of the glow plug. Unlike in the exemplary embodiment according to FIG. 4, the fuel feed pump is started about 5 sec before the initiation of the intermittent mode of operation.

Figure 6:
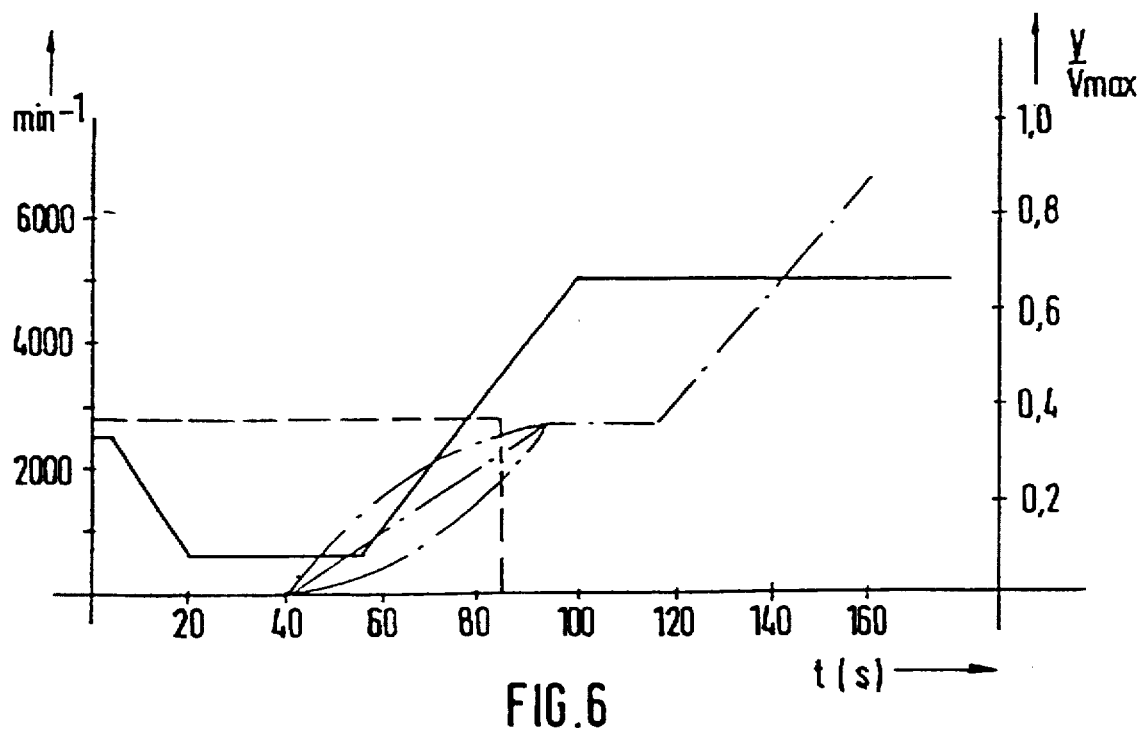
Figure 7:
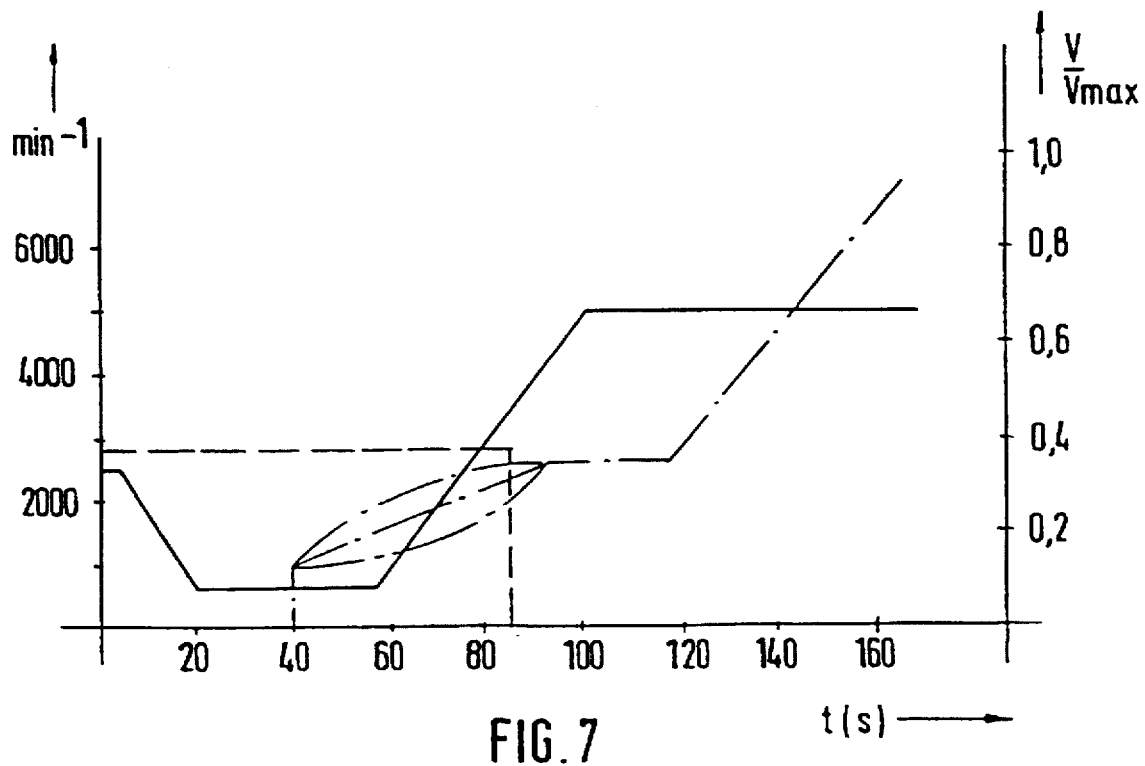

The exemplary embodiments according to FIGS. 6 and 7 correspond in terms of the switching on of the glow plug over time and the changes in the speed of the combustion air blower over time essentially to the exemplary embodiment according to FIG. 3 up to the time of 150 sec. However, the speed of the fuel feed pump is not brought abruptly to the "reduced delivery capacity" in the exemplary embodiment according to FIG. 6, but it is raised with a delivery capacity gradually increasing during an interval of time. This raise begins shortly before the speeding up of the blower (or optionally simultaneously) and extends over a large part of the phase of speed-up of the blower (optionally also over the entire phase of speed-up of the blower). As is shown, the speeding up of the fuel feed pump may be performed especially with linearly, degressively or progressively increasing output.

The exemplary embodiment according to FIG. 7 differs from the exemplary embodiment according to FIG. 6 in that the increase in the delivery capacity of the fuel feed pump does not start from zero delivery capacity, but from an initial delivery capacity, to which the fuel feed pump had been brought abruptly at the start-up.

FIGS. 4 and 5 show an upper switch-on line of the glow plug, which represents the operation at the increased voltage for the second attempt at start. Such operation with increased voltage may also be provided in the other exemplary embodiments.

It is also obvious that the gradually increasing delivery capacity of the fuel feed pump illustrated in FIGS. 6 and 7 may also be provided in the exemplary embodiments according to FIGS. 4 and 5 after the start of the fuel feed pump.

As was mentioned above, the glow plug 4 is designed especially as a sheathed element glow plug here. Such sheathed element glow plugs are preferably used because this type of glow plug makes it possible to ignite the vaporizing burner in a power-saving manner. Careful coordination of the operation of the glow plug, of the combustion air blower and of the fuel feed pump is instrumental for a reliable ignition especially in the case of such sheathed element glow plugs.

A vehicle heater with a special burner was described on the basis of FIGS. 1 and 2. As is apparent from the explanation of FIG. 3, the ignition of the burner is an important aspect in the present invention. Such a burner and ignition procedure may also be used in a regenerator for particle filters of an otherwise usual design for diesel engines.

While specific embodiments of the invention have been shown and described in detail to illustrate the application of the principles of the invention, it will be understood that the invention may be embodied otherwise without departing from such principles.

We claim:

1. A burner comprising:

a combustion chamber;

fuel feed means for feeding fuel to said combustion chamber;

fuel evaporating means provided in said combustion chamber and for receiving fuel from said fuel feed means and evaporating the fuel in said combustion chamber;

air blower means for delivering combustion air to said combustion chamber;

glow plug means provided with said combustion chamber and for igniting a mixture of evaporated fuel and combustion air;

control means for operating said air blower means at a first speed, said control means then decreasing a speed of said air blower to a substantially constant value while switching on said glow plug means, and starting said fuel feed means at a first predetermined time after switching on said glow plug means, said control means initiating a gradual increase in a speed of said air blower means at one of a time substantially simultaneously with a starting of said fuel feed means and at a second predetermined time after starting of said fuel feed means.

2. A burner in accordance with claim 1, wherein:

said increase in said speed of said air blower starting from one of a stopped condition of said air blower means and from said air blower means already operating at a low speed.

3. A burner in accordance with claim 1, wherein:

said fuel feed means is operated at first at reduced delivery capacity, and said delivery capacity is later increased.

4. A burner in accordance with claim 1, wherein:

said fuel feed means is operated at a delivery capacity gradually increasing over a period of time, wherein increasing in said delivery capacity begins with said fuel feed means being in a condition of one of stopped and being at an initial delivery capacity.

5. A burner in accordance with claim 1, wherein:

said control means operates said air blower means at an initial speed before said gradual increase of said air blower means, said control means decreasing said initial speed before said gradual increase, said control means switches on said glow plug one of before and after said gradual increase.

6. A burner comprising:

a combustion chamber;

fuel feed means for feeding fuel to said combustion chamber;

fuel evaporating means provided in said combustion chamber for receiving fuel from said fuel feed means and for evaporating the fuel in said combustion chamber;

air blower means for delivering combustion air to said combustion chamber;

glow plug means provided with said combustion chamber and for igniting a mixture of evaporated fuel and combustion air;

control means for operating said air blower means at a first speed, said control means then decreasing a speed of said blower to a substantially constant value while switching on said glow plug means, and starting said fuel feed means at a first predetermined time after switching on said glow plug means, said control means initiating an intermittent mode of operation of said air blower means at one of substantially simultaneously with starting of said fuel feed means and at a second predetermined time after starting of said fuel feed means.

7. A burner in accordance with claim 6, wherein:

said control means initiates a gradual increase in said speed of said air blower means subsequent to said intermittent mode of operation.

8. A method for igniting a burner, the method comprising the steps of:

providing a combustion chamber;

providing fuel feed means for feeding fuel to said combustion chamber;

providing fuel evaporating means in said combustion chamber for receiving fuel from said fuel feed means and for evaporating the fuel in said combustion chamber;

providing air blower means for delivering combustion air to said combustion chamber;

providing glow plug means with said combustion chamber for igniting a mixture of evaporated fuel and combustion air;

with the fuel feed means switched off putting said combustion air blower means into operation for a predetermined period of time at a predetermined substantially constant speed in a range beginning from at least a medium speed and subsequently gradually reducing the speed to a minimum blower speed;

subsequently maintaining said minimum blower speed at a substantially constant value during a pre-glow phase with said glow plug means switched on;

subsequently increasing a speed of said air blower means to a substantially constant blower speed with said fuel feed means switched on and said glow plug switched on;

switching said glow plug off during said step of increasing said blower speed.

9. The method in accordance with claim 8, wherein a phase of speed increase of said combustion air blower has an additional speed plateau.

10. The method in accordance with claim 8, wherein said glow plug is switched on at the same time as said combustion air blower or offset in time during the phase of reducing the blower speed.

11. The method in accordance with claim 8, wherein said fuel feed means is started during a phase during said step of maintaining said minimum blower speed.

12. The method in accordance with claim 11, wherein said fuel feed means is switched on at a first delivery rate constant value.

13. The method in accordance with claim 11, wherein a delivery rate of said fuel feed pump is increased to a first constant value of the delivery rate linearly, progressively or degressively.

14. The method in accordance with claim 11, wherein said fuel feed pump is switched on first to an initial delivery capacity and its delivery rate is subsequently increased to a first constant value gradually linearly, progressively or degressively.

15. The method in accordance with claim 11, wherein a delivery capacity of said fuel feed pump is increased gradually to an operating delivery capacity after operation at a first constant value.

16. The method in accordance with claim 15, wherein said step of increasing a delivery rate of said fuel feed pump comprises a reaching a plateau of the delivery rate and reaching a second constant value of the delivery rate.

17. The method in accordance with claim 8, wherein a control device switches off said glow plug as soon as a flame failure controller detects a stable combustion flame in said combustion chamber.

18. The method in accordance with claim 8, wherein a control device switches off said glow plug when a certain time has passed after it had been switched on.

19. The method in accordance with claim 8, wherein said glow plug is operated at increased voltage during a second attempt at starting.

* * * * *